United States Patent
Tsintzouras et al.

(10) Patent No.: US 7,841,724 B2
(45) Date of Patent: Nov. 30, 2010

(54) METHOD AND APPARATUS FOR STORING LAMP DATA

(75) Inventors: George Tsintzouras, Kitchener (CA); Mike Perkins, Kitchener (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 518 days.

(21) Appl. No.: 11/239,166

(22) Filed: Sep. 30, 2005

(65) Prior Publication Data

US 2007/0075647 A1  Apr. 5, 2007

(51) Int. Cl.
*G03B 21/14* (2006.01)
(52) U.S. Cl. ............................. 353/85; 353/87; 353/119
(58) Field of Classification Search .................. 353/85, 353/87, 119
See application file for complete search history.

(56) References Cited

U.S. PATENT DOCUMENTS

2002/0005697 A1  1/2002  Morgan et al.
2003/0214638 A1*  11/2003  Okada .......................... 353/87
2005/0024219 A1  2/2005  Childers
2006/0238722 A1*  10/2006  Jayaram et al. ............... 353/85
2007/0159604 A1*  7/2007  Belliveau ..................... 353/30

FOREIGN PATENT DOCUMENTS

| JP | 08220637 A | * | 5/1995 |
| JP | 08-220637 | | 8/1996 |
| JP | 2000-131758 | | 5/2000 |

OTHER PUBLICATIONS

European communication for corresponding European Patent Application No. 06018051.0 dated Feb. 8, 2010, 3 pgs (in English).
Partial Search Report for corresponding European Appln. No. 06 01 8051 dated Nov. 8, 2006.

* cited by examiner

*Primary Examiner*—Tuyet Thi Vo
(74) *Attorney, Agent, or Firm*—Staas & Halsey LLP

(57) ABSTRACT

A lamp memory module is provided for recording lamp serial numbers, providing a 'lamp-inserted' interlock for preventing operation of the lamp when the lamp is not properly installed, and for collecting and storing lamp operational data such as lamp use (time), lamp strikes and various system temperatures.

13 Claims, 5 Drawing Sheets

METHOD AND APPARATUS FOR STORING LAMP DATA

BACKGROUND OF THE INVENTION

1. Field of the Invention

The present invention is directed to projection systems, and more particularly to a method and apparatus for capturing and storing lamp operational data in a digital projector.

2. Description of the Related Art

Digital projection systems are well known in the art, having been used for a number of years in many applications, including the film industry, military and civilian simulations, control rooms, etc. The lamp module in such projectors is expensive and subject to performance degradation over time as a result of usage at various power levels, number of lamp strikes as well as system temperatures at various locations. The inventors have realized that certain benefits can be derived from tracking lamp operational data, such as hours of usage, number of lamp strikes, temperatures, etc., and using this data to address future design issues such as operational differences between rental staging environments and fixed installations in cinema applications, legitimacy of customer equipment return claims, etc.

Quite apart from the foregoing, the inventors have recognized that opening of the lamp access door exposes the high-voltage lamp module power. It is desirable to minimize risk of accidental electrocution when the lamp is not properly installed. According to the prior art, a mechanical push button type switch is provided for deactivating lamp power when the access door is open. However, the switch may be easily bypassed and also introduces cost into production of the lamp module.

SUMMARY OF THE INVENTION

Therefore, according one aspect of the present invention, a lamp memory module is provided for recording lamp serial numbers, providing a 'lamp-inserted' interlock for preventing operation of the lamp when the lamp is not properly installed, and for collecting and storing lamp operational data such as lamp use (time), lamp strikes and various system temperatures.

By encouraging customers to return spent lamp assemblies to the manufacturer, for example, to comply with a lamp recycling program (e.g. www.lamprecycle.org), the manufacturer is provided with useful data concerning field conditions regarding the use of their lamps.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
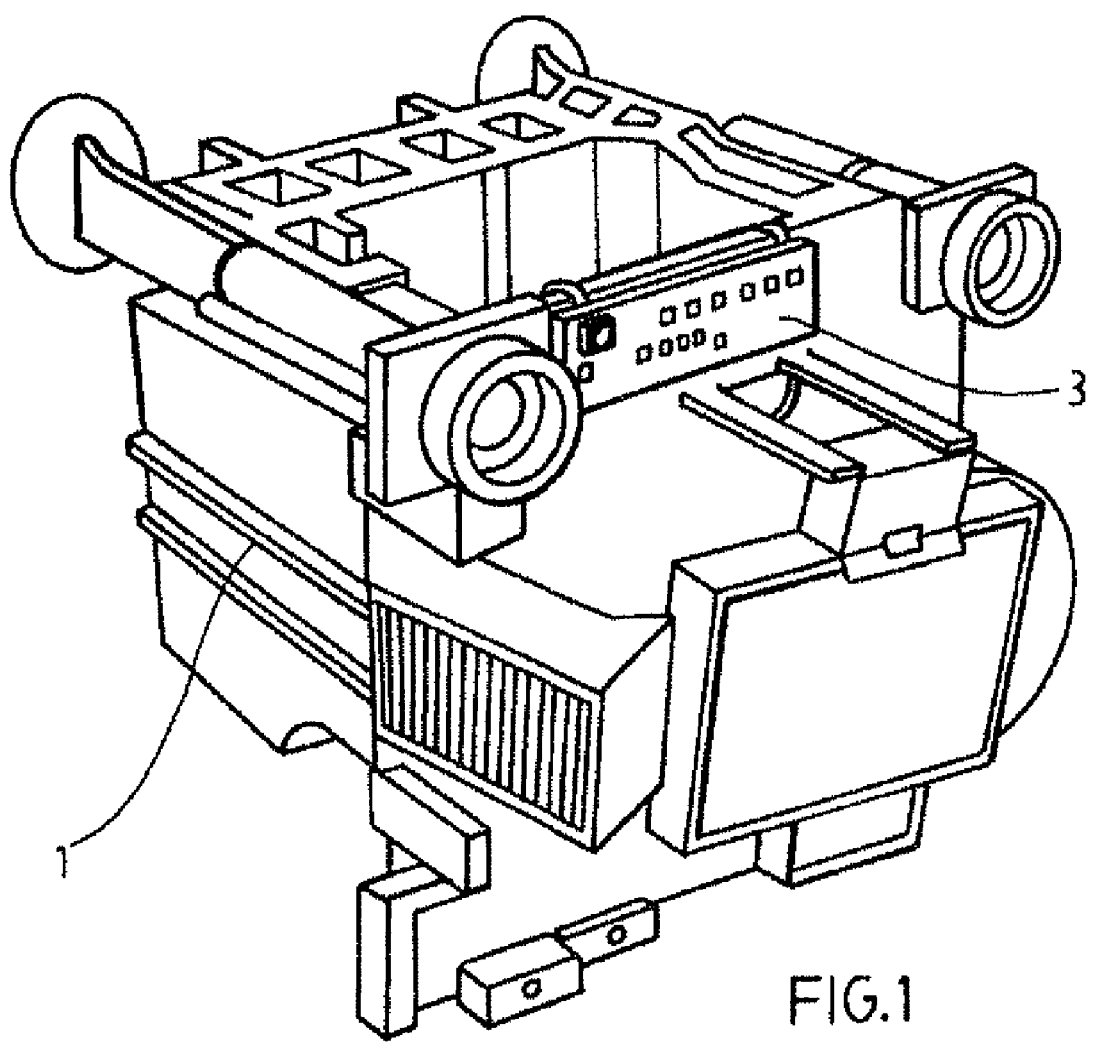
FIG. 1 shows a lamp memory module installed on a projector lamp assembly, according to the present invention.

With reference to FIG. 1, a conventional lamp module 1 is shown with a printed circuit board (PCB) housing a lamp memory module 3 (non-volatile memory) and securely mounted to the same assembly as the lamp, lamp power connector and the mechanical support structure. As indicated above, a projector lamp will burn out over time, depending on operating conditions. Thus, it is highly desirable to review the operating conditions to which a lamp has been exposed during its lifetime, in order to take such conditions into consideration when designing future lamps. As discussed in greater detail below, the lamp memory module 3 records such operating conditions for later retrieval by the manufacturer. In order to encourage users to return the spent lamps and memory module 3 to the manufacturer, it is contemplated that a program be established for customers whereby prepaid postage is provided with each replacement module along with a request that the customer use existing packaging to return the spent module for recycling purposes (recycling is strongly encouraged because the lamps contain mercury).

As shown in FIG. 2, each lamp 5 is powered by ballast 7 under control of software operating in a system controller or CPU 9. Each lamp memory module 3 is connected to CPU 9 via a connector 11. A plurality of temperature sensors 13 are connected to the CPU 9, as is a real-time clock 15, with battery backup, discussed in greater detail below.

Figure 2A:
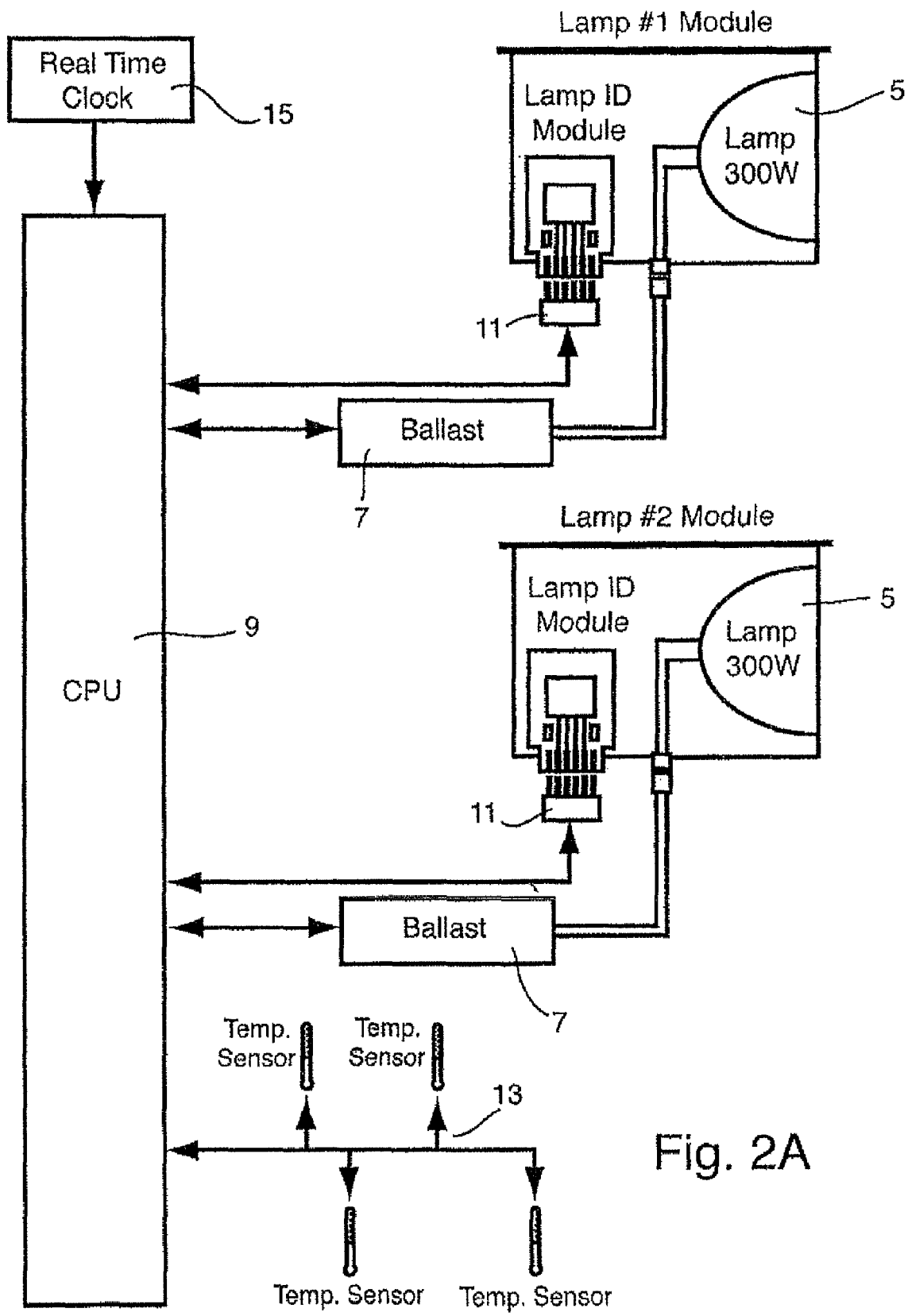
FIG. 2A is a block diagram of the lamp memory module of FIG. 1.
Figure 2B:
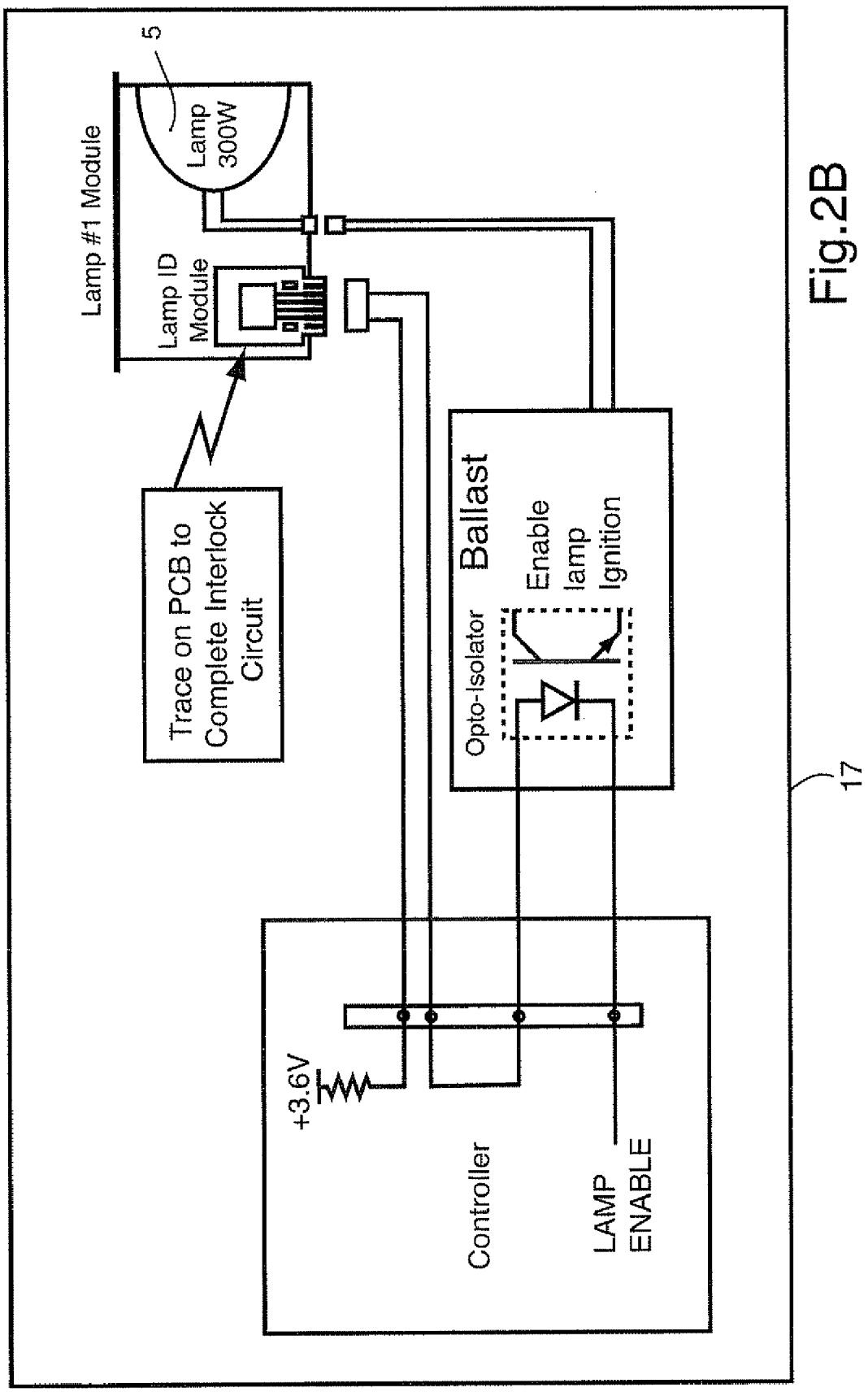
FIG. 2B is a block diagram of a lamp-interlock function of the lamp memory module of FIG. 2A.

Turning briefly to the FIG. 2B, the safety interlock system is shown according to one aspect of the present invention. This system provides protection against any attempt to operate the projector when the lamp 5 is not properly installed, and is less expensive, more reliable and fail-safe relative to prior art mechanical switches. The lamp 5 is powered from ballast 7, which is energized upon receiving a lamp enable signal from the CPU or control or 9. If power is disrupted, the ballast 7 does not attempt to energize the lamp 5, and no voltage is present on the lamp power connector. Ballast 7 includes an opto-isolator interface 17, which derives power from a SELV (Safety Extra Low Voltage) source, via the lamp memory module 3. If the lamp module 1 is not installed, or if it is removed while the unit is operating, the interlock circuit trace 19 around the lamp memory module PCB becomes open-circuited. This disrupts power to the opto-isolator 17 which, in turn, disables the output of ballast 7, thereby placing the unit into a safe condition. In order to activate the lamp ballast 7, a conduction path must be established via the circuit trace 19 around the lamp memory module 3. The interlock can only be overridden by inserting a conductive wire between the two outer pins of the interlock connector, which constitutes an intentional effort and requires a tool.

Figure 3A:
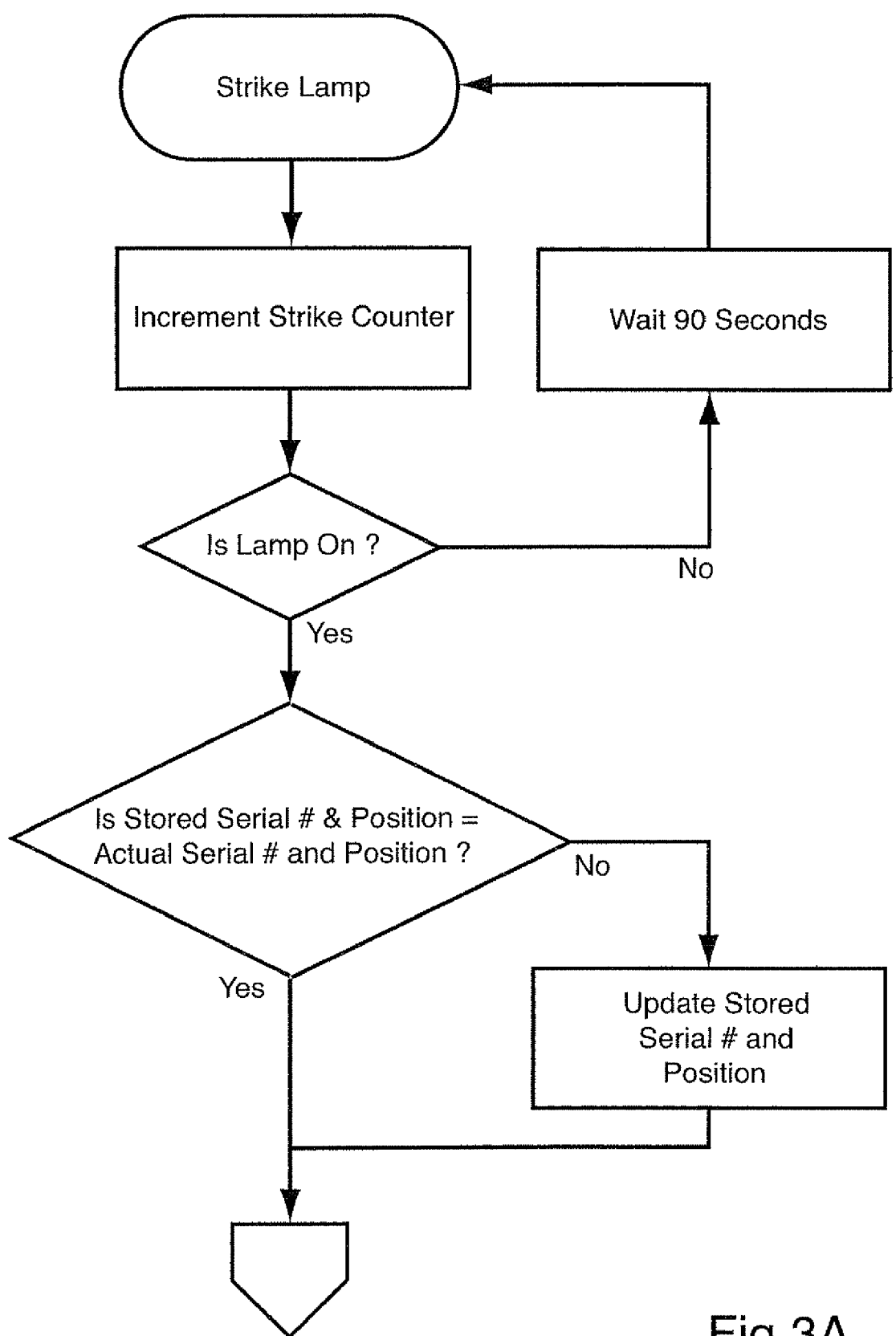
FIGS. 3A and 3B, in combination, comprise a flow chart showing steps in collecting lamp operational information, according to the preferred embodiment.
Figure 3B:
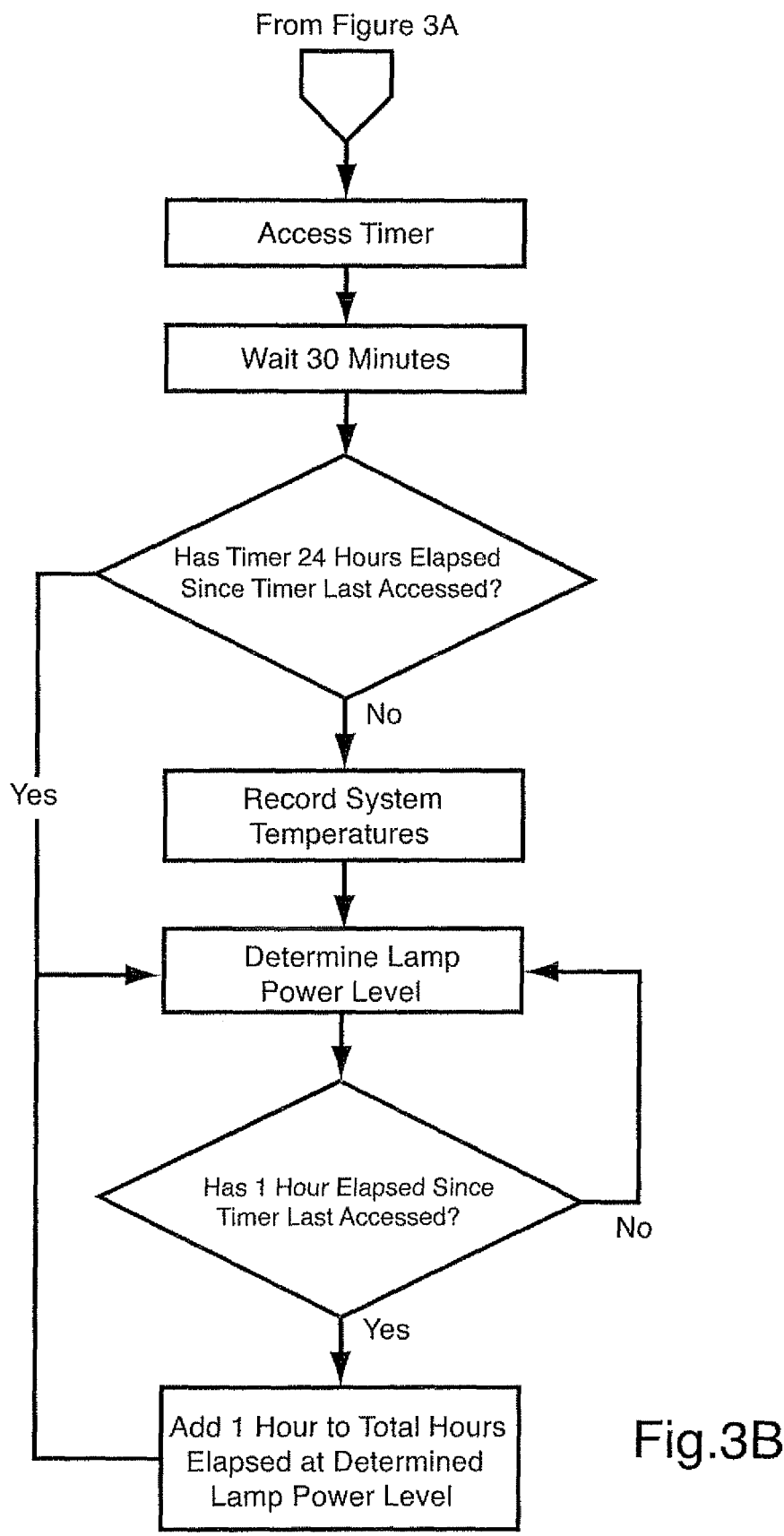

With reference to FIGS. 3A and 3B, a flow chart is provided showing steps of a software program executed by CPU 9 for collecting lamp operational data.

The phrase "lamp strike" refers to the act of turning on the lamp 5. This process is known to be stressful on a lamp, and an excessive number of lamp strikes (i.e. turning the lamp on and off repeatedly) can shorten the life of the lamp. Lamp striking is controlled by a lamp driver (not shown) controlled by software within CPU 9. Turning to FIG. 3A, when a lamp 5 is turned on, the software issues a command to the lamp driver to strike the lamp. The software then waits for a response. If the lamp is successfully ignited, a positive indication is returned from the lamp driver. If the lamp fails to ignite, a negative response is returned. In the case of a lamp ignition failure, the software waits 90 seconds and then tries again. If the system is operated in "single lamp" mode, the software alternates between lamps until one lamp successfully ignites. The total number of attempted lamp strikes and successful lamp strikes are recorded in memory 3 upon occurrence, independently for each lamp 5.

At the time of manufacture, memory 3 is programmed with the serial number of the projector and data indicating the position of the lamp module 1 within the projector (projectors frequently include more than one lamp module, as shown in FIG. 2A). When the lamp 5 is activated, the serial number and position information stored in memory 3 are compared to the serial number of the projector and the current location of the lamp module 1, as shown in FIG. 3. In the event of any change, the serial number and position information is updated within memory 3.

As shown in FIG. 2A, a plurality of sensors 13 are located throughout the projector, for measuring temperature. According to the preferred embodiment, sensors 13 are disposed for detecting lamp compartment temperature, operating temperature of controller 9, and air exhaust temperature. These sensors are accessible to the software running within CPU 9. When the lamp is turned on, the software accesses timer 15 and waits 30 minutes for the system temperature to stabilize. The system temperature is then measured and stored within memory 3. However, as shown in FIG. 3A, system temperature is recorded only once a day such that if a lamp 5 is turned on and off multiple times within a 24 hour period, only the first set of measurements are recorded. If a lamp 5 is turned on and left on for more than 24 hours, at the end of that 24 hour. Another set of measurements is taken. If the lamp is not used at all, no records are made of projector temperature for that day. Preferably, the software is configured to store a plurality of sets of measurements (e.g. 30 or more), with only the most recent data have been retained. In addition, the highest and lowest operating temperatures are maintained it in memory 3 over the life of the lamp 5. Each time the temperature is updated, the date and time as read from the real-time clock 15 are also updated.

The power level at which a lamp 5 is operated, is controlled by the lamp driver which, in turn, is controlled by the software running in CPU 9. Consequently, the software inherently knows what power the lamp is operating at. The cumulative total for lamp operation is tracked and the lamp our information is updated once per hour. In order to reduce the amount of data storage, power level is divided into three ranges (low, medium, and high), as shown in FIG. 3B. According to the preferred embodiment, "a low power" is defined as operation between minimum power and 33%, "medium power" is defined as operation between 33% to 66%, and maximum scratch that "maximum power" is defined as operation between 66% to 100%.

As indicated above, the lamp memory module 3 of the present invention stores operational data including a number of hours that a lamp 5 has run at low power, medium power and maximum power, the number of successful and attempted lamp strikes, the serial number of the last projector the lamp was installed in and the position where the lamp was installed (in a dual lamp system, the lamp and may be installed in either slot 1 or 2), the time and date of the last temperature measurement, all system temperatures for the last 30 days of operation, and at the maximum and minimum temperatures ever measured. It will be appreciated that, in addition to the foregoing data, the software may be modified and additional hardware items installed to track other operational data for the lamp 5.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. In a projector system having a lamp, the improvement comprising a lamp memory module for storing a projector serial number, position of said lamp in said projector system, operational information for said lamp, and times and dates for at least some of said operational information, said serial number and information being accessible after said lamp is spent, said lamp memory module mounted on an external surface of a lamp module.

2. The improvement of claim 1, wherein said lamp memory module includes a safety inter-lock system for deactivating said lamp in the event said lamp is not properly installed.

3. The improvement of claim 1, wherein said information includes at least one of lamp hours information, lamp strike information, time and date of a last temperature measurement, all system temperatures for previous 30 days of operation, and maximum and minimum temperatures measured.

4. The improvement of claim 3, wherein said lamp hours information includes number of hours said lamp has been operated at low power, medium power and high power levels.

5. The improvement of claim 3, wherein said lamp strike information includes total number of successful lamp strikes and total number of attempted lamp strikes.

6. The improvement of claim 3, wherein said system temperatures include lamp compartment temperature, system controller temperature, air exhaust temperature and maximum and minimum ones of said lamp compartment temperature, system controller temperature and air exhaust temperature.

7. A method of operating a projector system having a lamp, the method comprising:
   mounting a lamp memory module on an external surface of a lamp module;
   pre-programming said lamp memory module with a serial number for said projector system and a position of said lamp in said projector system; and
   collecting operational information for said lamp, and times and dates for at least some of said operational information, said serial number and information thereby being accessible for analysis after said lamp is spent.

8. The method of claim 7, wherein said information includes at least one of lamp hours information, lamp strike information, time and date of last temperature measurement, all system temperatures for previous 30 days of operation, and maximum and minimum temperatures measured.

9. The method of claim 8, wherein said lamp hours information includes number of hours said lamp has been operated at low power, medium power and high power levels.

10. The method of claim 8, wherein said lamp strike information includes total number of successful lamp strikes and total number of attempted lamp strikes.

11. The method of claim 8, wherein said system temperatures include lamp compartment temperature, system controller temperature, air exhaust temperature and maximum and minimum ones of said lamp compartment temperature, system controller temperature and air exhaust temperature.

12. A method comprising:
   mounting a lamp memory module on an external surface of a lamp module pre-programming said lamp memory module with a serial number of a projector system having a lamp; and
collecting operational information for said lamp, and times and dates for at least some of said operational information.

13. A projector system comprising:
a lamp module comprising a lamp; and
a lamp memory module to store a projector serial number and operational information for said lamp, and times and dates for at least some of said operational information, said lamp memory module mounted on an external surface of said lamp module.

* * * * *